May 7, 1968    F. F. KREMPA ET AL    3,381,354
METHOD FOR MANUFACTURING A REPLACEABLE TOOTH SPROCKET
Filed April 28, 1966
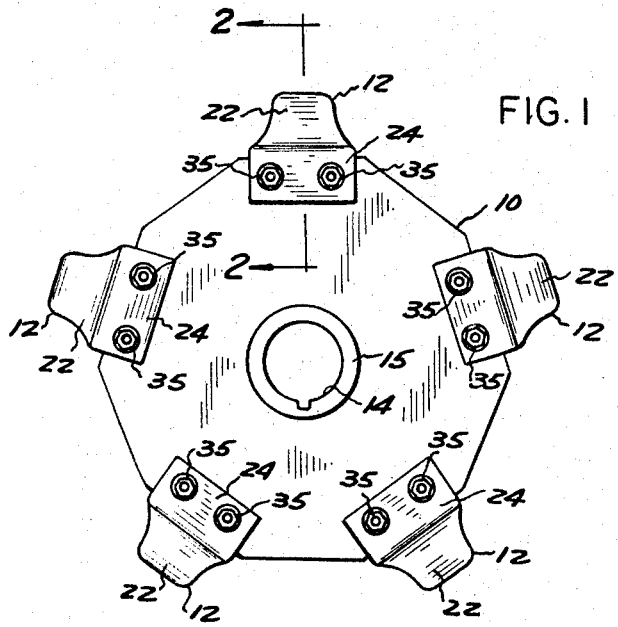
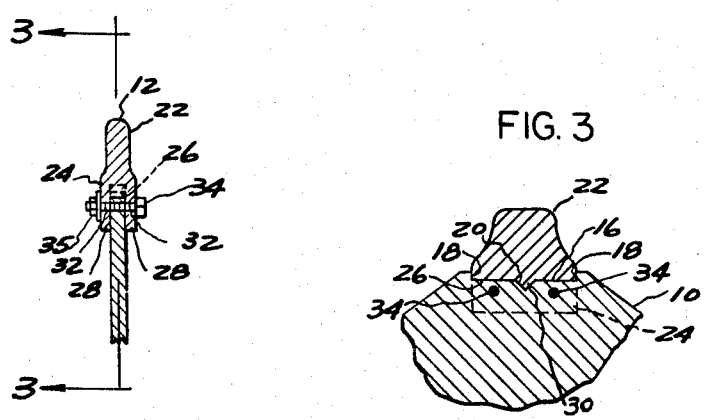
INVENTORS
FELIX F. KREMPA
MICHAEL MASICH
BY Hauke, Krass & Gifford
ATTORNEYS United States Patent Office 3,381,354
Patented May 7, 1968

3,381,354
METHOD FOR MANUFACTURING A
REPLACEABLE TOOTH SPROCKET
Felix F. Krempa and Michael Masich, Detroit, Mich., assignors of fifty percent to ABC Machining and Fabricating, Detroit, Mich., a partnership, and fifty percent to Chain Supply Company, Detroit, Mich., a corporation of Michigan
Filed Apr. 28, 1966, Ser. No. 545,910
5 Claims. (Cl. 29—159.2)

ABSTRACT OF THE DISCLOSURE

A method for making a sprocket by flame cutting a plate to form a wheel with a series of circumferentially spaced, recessed seats and mounting a replaceable tooth in each seat.

---

Most conventional sprockets currently being used to transmit power by means of roller chains are constructed as an integral unit. Although this provides a relatively low cost sprocket upon installation, when subjected to industrial power requirements, such sprockets occasionally break and frequently wear thereby requiring replacement. Replacement of an integrally constructed sprocket requires that the machines powered by the sprocket must be shut down so that the defective sprocket can be removed from its shaft, a new sprocket installed and the necessary adjustments made in the roller chain. Because down time for purposes of repair in high speed assembly lines is costly, some sprockets have been made available with replaceable teeth or multi-tooth segments so that one or more teeth may be replaced in a minimum amount of time, thereby eliminating the step of removing the sprocket wheel from the shaft of the related machine. However, most sprockets with replaceable teeth that are available are constructed of a complicated structure so that the tooth can be firmly attached to the wheel. As a result, although conventional replaceable toothed sprockets have an advantage of reducing down time, they have, due to their structure which requires a number of manufacturing steps, an inherently higher original cost.

The present invention provides a sprocket with replaceable teeth thereby reducing the down time costs of replacement and in addition provides such a sprocket made of a few simply constructed parts, thereby substantially reducing the initial costs of such sprockets. The preferred method comprises forming a plate into a wheel having an axial opening for receiving a shaft and being readily adaptable to any conventional type hub means for fixing the shaft to the wheel. The wheel can be quickly and inexpensively formed by flame-cutting casting or forging a plate of hot rolled steel to the desired shape. The preferred wheel is formed with a plurality of circumferential seats each having a pair of opposed shoulders and an intermediately formed V-notch. Teeth having enlarged bases are each formed with a longitdinal slot through the base defining a pair of ribs which are insertable on the wheel seat. The seat shoulders assist in locating the teeth and provide support and stability to the teeth upon the imposition of forces by the roller chain. The tooth slot has an internal V-shaped tongue which is received by the wind seat notch to thereby cooperate with the shoulders in locating the tooth on the seat. A plurality of screws through the tooth ribs and the wheel lock the tooth to the seat. The teeth can be readily formed by flamecutting, casting or forging to provide an inexpensive replaceable component. It is apparent that the preferred embodiment of the present invention provides an inexpensive sprocket assembly in which the teeth can be quickly replaced in the event of breakage. The wear life of these sprockets can be considerably increased by simply and quickly reversing the teeth during normal maintenance so that the chain makes contact with opposite sides of the teeth.

Conventional sprockets having integral teeth can be easily reworked to produce a sprocket wheel in accordance with the present invention. The fixed tooth sprocket is located in a fixture, and a template disposed adjacent the sprocket. The template is formed to define the circumferential seats and locating shoulders. The integrally formed teeth can be removed and the seats for replaceable teeth formed in a flamecutting operation. The seats are then finished to remove any burrs. The preferred slotted teeth are then inserted over the seats and a plurality of apertures drilled through the ribs and the reworked sprocket wheel. Alternatively, the bolt holes could be drilled by using any conventional jig. The apertures are adapted to receive bolts which are inserted therethrough, and nuts engaged with the bolts to secure the teeth to the sprocket wheel.

Therefore it is an object of the present invention to provide an improved method for making a sprocket wheel having replaceable teeth which are simply constructed and which can be quickly replaced.

It is another object of the present invention to reduce the costs of replaceable toothed sprockets by providing a method for making such a sprocket having a wheel member and teeth which can be formed by flame-cutting, casting or forging.

It is still another object of the present invention to provide a method for making a sprocket with removable teeth wherein the wheel mounting seat is provided with a pair of shoulders and a transverse recess and which receives a slotted tooth having an internally disposed tongue so that the shoulders and tongue receiving recess cooperate in accurately locating the tooth.

It is a further object to provide a method for reworking sprockets having integral teeth to form a sprocket wheel having circumferential seats adapted to receive replaceable teeth, the method including the steps of placing the fixed toothed sprocket in a fixture and by flame-cutting to a template, removing the integral teeth and forming replaceable tooth seats in a single operation.

Still further objects and advantages will readily occur to one skilled in the art to which the invention pertains upon reference to the following detailed description and the accompanying drawings in which, FIGURE 1 is a top elevational view of a sprocket wheel illustratnig a preferred embodiment of the present invention, FIGURE 2 is a cross-sectional view as seen from line 2—2 in FIGURE 1; and FIGURE 3 is a cross-sectional view as seen from line 3—3 in FIGURE 2.

Now referring to the drawings, FIGURE 1 illustrates a preferred sprocket which comprises a wheel member 10 having a plurality of replaceable teeth generally indicated at 12 fixed to its circumferential rim. For purposes of description the illustrated sprocket has five removable teeth, but it is to be understood that the invention is applicable to a sprocket having any number of teeth.

The wheel 10 is preferably flame-cut from a sheet of hot-rolled steel chosen of a suitable gage, however it may be readily formed by a casting or forging method. An axial opening 14 is preferably formed in the wheel 10 to receive a shaft (not shown). A hub 15 having a keyway may be fixed to the wheel 10 by welding, bolting or the like to assist in fixing the sprocket to the shaft. The embodiment as illustrated in FIGURE 1 would be provided to the industrial user who would then adapt the sprocket to the particular power transmission device being utilized.

A plurality of equiangularly circumferentially spaced, flat seats 16 are formed on the perimeter of the wheel 10 and are radially recessed therefrom to form opposed shoulders 18 at each end of the seats 16 as is shown in FIGURE 3. Preferably a V-shaped notch 20 is formed transversely of the seat 16 and on a radius of the wheel 10.

The teeth 12 are adapted to be received by the seats 16 around the periphery of the wheel 10. Each tooth 12 includes a conventional sprocket tooth portion 22 and a supporting enlarged base 24. The configuration of the sprocket tooth portion 22 is adapted to the particular installation, the precise contour and shape not being important for purposes of the present description will not be further described.

One tooth 12 is provided for each of the seats 16. As can best be seen in FIGURE 2, a longitudinal slot 26 is formed in the base 24 to define a pair of ribs 28. The width of the slot 26 is complementary to the thickness of the wheel 10 so that the tooth base 24 can be inserted over the seat 16. To assist the base 24 to be located on the wheel 10 by the shoulders 18, the length of the tooth base 24 is formed complementary to the length of the recessed tooth seat 16. Preferably an internally disposed V-shaped tongue 30 is formed in the slot 26 intermediately of the ends of the slot 26 and is adapted to be received by the notch 20. As seen in FIGURE 3, it should be evident that the notch 20 and the shoulders 18 co-operate in locating the tooth 12 as it is inserted over the base 16. In addition the shoulders 18 provide circumferential support and stability for each tooth 12 when the preferred sprocket wheel is transmitting power.

In order to lock the individual teeth 12 on the sprocket wheel 10, apertures 32 through the ribs 28 and the wheel 10 are formed to permit bolts 34 to be inserted and engaged with washers and nuts 35.

It is apparent that the configuration of the teeth 12 permits manufacture by a cold forging operation utilizing a conventional high speed hydraulic press. The slots 26 would then be finished to allow a relatively close fit when the teeth 12 are inserted and locked on the wheel 10. The structure of the teeth 12 is also readily adaptable to a casting or flame-cutting forming method.

It should be evident from this description that the teeth may be readily and easily replaced. A broken tooth may be replaced or a worn tooth reversed by first removing the bolts 34, slipping the broken or worn tooth radially relative to the wheel 10 from the seat 16. A new tooth is then inserted or the worn tooth reversed, to expose an opposite tooth side to the wearing forces, by slipping the tooth over the seat 16 so that it is located by the notch 20 and the shoulders 18. The bolts 34 and nuts 35 are then replaced to lock the tooth in place.

It should be further evident that we have described an improved sprocket wheel which can be quickly replaced without removing the wheel from the machine shaft. In addition the construction of the wheel 10 and teeth 12 are readily adaptable to modern forming operations requiring but a minimum number of finishing steps. The wheel 10 can be readily flame-cut to a template from a suitable chosen gage of plate steel requiring only a finishing operation on the seats 16. The teeth 12 can be cold forged or flame-cut from a block of steel of a higher grade than the wheel 10. The slots 26 and tooth portion 22 are preferably finished and holes for the bolts 34 drilled through the tooth ribs 28 and the wheel 10. The few operations necessary in forming the components of the improved sprocket wheel results in a lower cost assembly than is available by present methods.

It is to be understood that the V-shaped tongue and slot locating means are required only where the seats 18 cannot be accurately formed to center the tooth 22 on a radial line of the wheel 10.

Sprocket wheels with integral teeth can be readily reworked to form the wheel 10 by placing such sprocket wheels in a fixture and flame-cutting to a template to remove the integral teeth and shape the seats 16 and shoulders 18 in one operation. The seats 16 would then be finished by removing the burrs by any conventional means such as filing and the like.

It is apparent that although we have described but a single embodiment of the present invention many changes and modifications can be made therein without departing from the spirit of the invention as expressed by the scope of the appended claims.

We claim:

1. A method for manufacturing a sprocket wheel having removable teeth, comprising the steps of:
    (a) shaping a plate to form a wheel having a plurality of peripheral, recessed seats;
    (b) shaping a plurality of individual teeth members each having a base formed with a longitudinal slot defining a pair of ribs;
    (c) forming an aperture through each pair of ribs and within each seat portion area of the wheel for bolting the assembly together;
    (d) assembling each pair of ribs over the recessed seats with the apertures in alignment for receiving a bolt; and
    (e) inserting a bolt in each set of aligned apertures and securing a nut on each bolt.

2. A method for manufacturing a sprocket wheel as recited in claim 1, wherein said wheel shaping step includes flame-cutting a plate of steel to a template, said template defining a wheel contour including a plurality of peripheral, recessed seats.

3. A method for manufacturing a sprocket wheel as recited in claim 1, wherein said tooth shaping step includes casting said tooth shaped member, and finishing the slot and contoured portions of said tooth.

4. A method for manufacturing a sprocket wheel as recited in claim 1, wherein said tooth shaping step includes forging said tooth shaped member, and finishing the slot and contoured portions of said tooth.

5. A method for manufacturing a sprocket wheel as recited in claim 1, wherein said wheel shaping step includes flame-cutting an integral toothed sprocket wheel to a template, said template defining a wheel contour including a plurality of peripheral, recessed seats.

References Cited

UNITED STATES PATENTS

| | | | |
|---|---|---|---|
| 1,222,625 | 4/1917 | Hay | 74—243 |
| 1,636,670 | 7/1927 | Shaw et al. | 29—159.2 |
| 1,638,140 | 8/1927 | Best | 74—243 X |
| 2,978,921 | 4/1961 | Donohoe | 29—159.2 X |

THOMAS H. EAGER, *Primary Examiner.*